Oct. 9, 1962 R. F. SCHONERT 3,057,359
PORTABLE HAYSTACKING FRAME
Filed Dec. 21, 1959 2 Sheets-Sheet 1
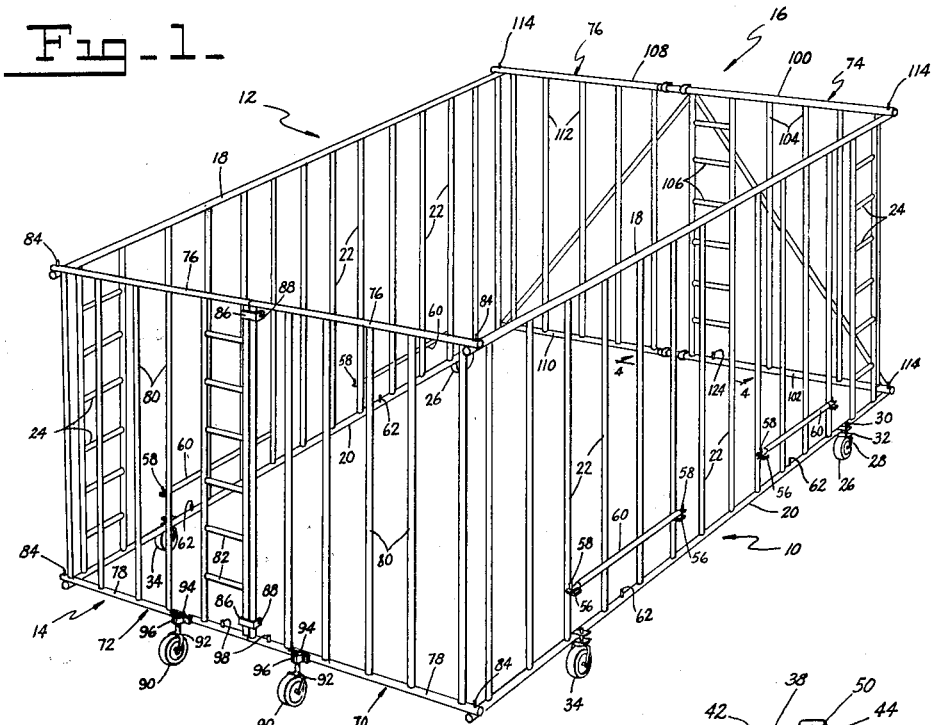
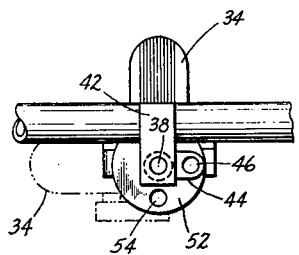
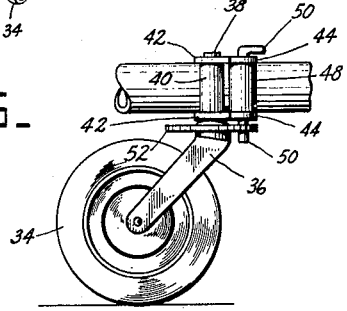
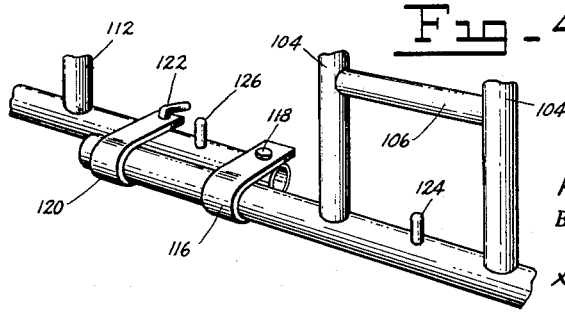
INVENTOR.
ROBERT F. SCHONERT
BY
Stuart R. Peterson
ATTORNEY

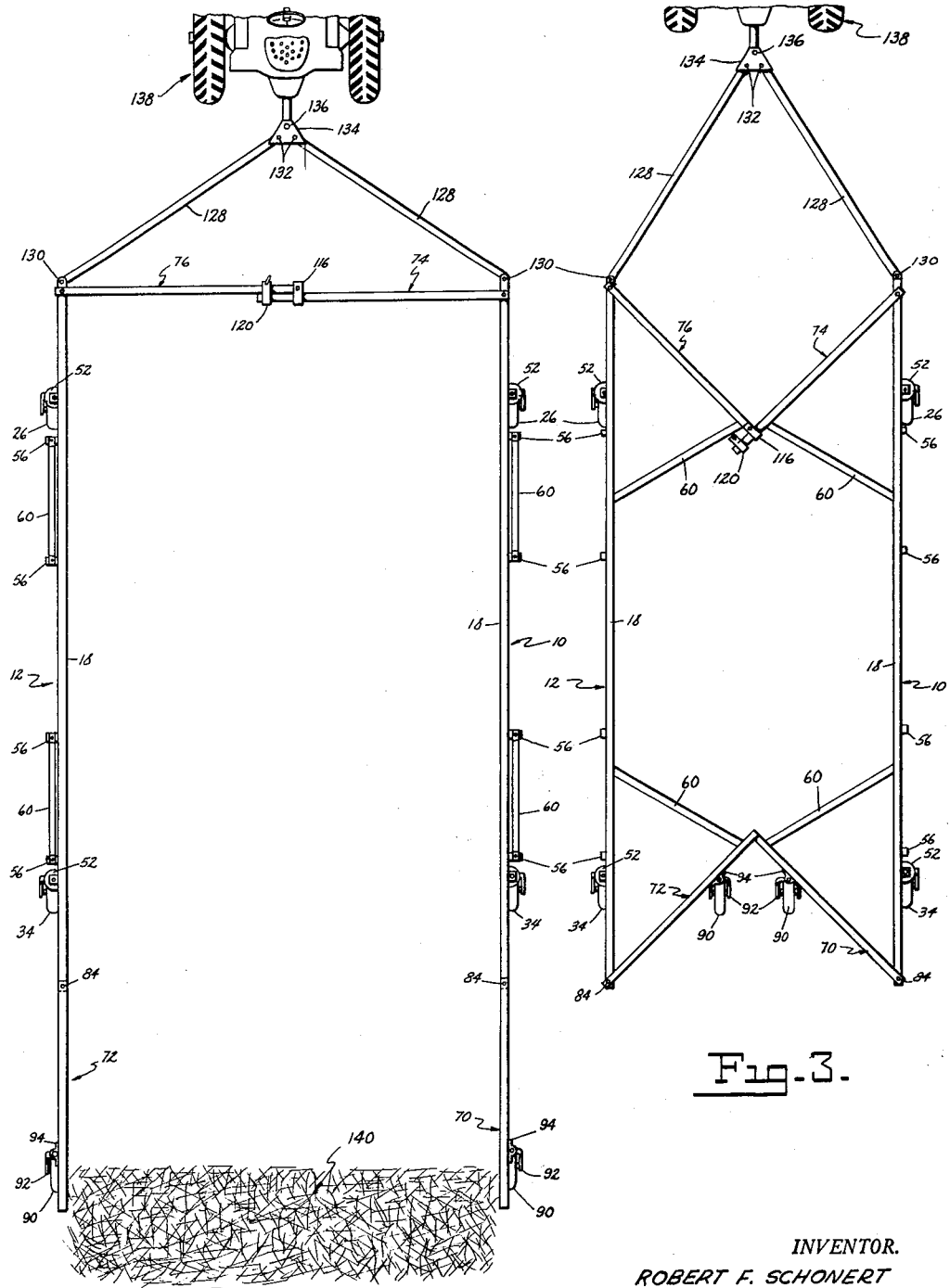

United States Patent Office 3,057,359
Patented Oct. 9, 1962

3,057,359
PORTABLE HAYSTACKING FRAME
Robert F. Schonert, Star Rte. 2, Bismarck, N. Dak.
Filed Dec. 21, 1959, Ser. No. 860,998
8 Claims. (Cl. 130—20)

This invention relates generally to haystacking devices, and pertains more particularly to a haystacking frame that can be moved from place to place so that hay can be stacked readily at different locations.

The primary object of the instant invention is to provide a portable haystacking frame that is partially collapsable so that it can be easily transported. In this regard, it is an aim of the invention to provide a frame that can be collapsed to such an extent that it can be towed along relatively narrow secondary roads and through relatively narrow gates.

Another object of the invention is to provide a haystacking frame that is stable and rigid when in either its extended condition for the accommodation of hay therein or when in its partially collapsed state when it is to be moved from location to location.

Another object of the invention is to provide a haystacking frame that can be almost completely collapsed so that it can be stored when not in use without occupying very much space.

Still another object is to provide a haystacking frame that can be quickly converted from one condition to another. Actually, one man can easily change the frame envisaged by the present invention from its hay receiving condition to a partially collapsed one end vice versa in only a small amount of time.

Yet another object of the invention is to provide for the facile withdrawal of the frame from the stacked hay for movement to a new location.

Also, the invention has for an object the ready access of hay loading equipment to the frame from all four sides during a loading or stacking operation.

Still another object of the invention is to provide a portable haystacking frame that is inexpensive to manufacture, light in weight, exceptionally sturdy, and long lasting.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIGURE 1 is a perspective view taken from the rear showing the haystacking frame in its expanded or haystacking condition;

FIGURE 2 is a plan view of the frame in the process of being withdrawn from a stack of hay which is only fragmentarily depicted;

FIGURE 3 is a plan view illustrating the frame in its partially collapsed state so that it can be transported from one place to another;

FIGURE 4 is a fragmentary perspective view, considerably enlarged, taken in the direction of line 4—4 of FIGURE 1;

FIGURE 5 is a plan view of one of the wheels which can be locked in a certain position to facilitate transport of the frame, the phantom outline position indicating the locked condition of the wheel and the solid line condition a position at right angles thereto so that the manner of locking may be more fully understood, and FIGURE 6 is an elevational view taken from one side of the wheel depicted in FIGURE 5.

Referring now in detail to FIGURE 1, the portable haystacking frame there depicted for purposes of illustrating the invention includes rectangular side walls 10, 12 and opposite end walls 14, 16. The side walls 10 and 12 are of identical construction and are comprised of upper bars 18, lower bars 20 and vertically extending bars 22 having their upper ends welded or otherwise secured to the bars 18 and their lower ends welded to the bars 20. It will be understood that the term "bars" is intended to be generic to other elongated members such as channels, I-beams and the like. If desired, a ladder can be employed at one end of each of the side walls 10 and 14, the rungs of such ladders having been denoted by the reference numeral 24.

Near the forward end, that is, the end away from the reader in FIGURE 1, of the side walls 10 and 12 are wheels 26. Each wheel 26 is carried on a fork unit 28 having an upstanding stub shaft 30 extending through a bearing or clevis 32. In this way, the wheels 26 are swively mounted so that they can swing about a vertical axis provided by the stub shaft 30 and their respective clevises 32.

Near the rear end of the side walls 10 and 12 are additional wheels 34 each of which is rotatably supported at the lower end of a fork unit 36 as best seen in FIGURE 6. The fork unit 36 in each instance has integral therewith an upstanding stub shaft 38 which extends through a bushing 40 fixedly attached between a pair of vertically spaced plates 42 which constitute a clevis. These plates 42 are actually somewhat L-shaped as can be discerned from FIGURE 5. Hence, each plate 42 has an angularly extending ear 44 containing an aperture 46. Between the ears 44 is fixedly secured a bushing 48. Through the agency of an L-shaped pin 50, which is of sufficient length so as to extend downwardly into engagement with a plate 52 integral with the fork unit 36, this plate 52 and its wheel 34 may be locked because of an aperture 54 therein for receiving the lower end of the L-shaped pin 50. The purpose of the pin 50 is to retain each of the more rearwardly located wheels 34 in a parallel relationship with its particular side wall 10 or 12 in each instance. More will be said hereinafter concerning the need for the locking feature which is provided by the pin 50 associated with each of the two wheels 34. It might be stated at this time, however, that FIGURE 5 has been specifically presented so an understanding of this feature may be had, the phantom outline of the wheel 34 being the locked position. The solid line position of the wheel 34 has been given solely so as to bring the aperture 54 of the plate 52 into view.

Although various arrangements can be used for providing a particular support now to be described, it will be observed that for the sake of simplicity a plurality of laterally projecting lugs 56 are welded to certain of the upstanding bars 22, these lugs 56 each being equipped with a vertical pin 58. While the function of the plurality of braces 60 which have apertures at each end will be better understood as the description progresses, it will be perceived that the lugs 56 are instrumental in the illustrated situation in supporting these various braces 60 when the braces are not in actual use.

It will also be observed that the lower bars 20 of each side wall 10, 12 are provided with a pair of pins 62. As indicated in the preceding paragraph, the role played by the various braces 40 will be understood more fully as the description proceeds. However, it can be explained at this time that the various pins 62 engage one end of the braces 60 when the haystacking frame is to be partially collapsed and held so for purposes of transportation.

Describing now the end walls 14 and 16, it will be seen that the end wall 14 is actually comprised of two separate and distinct sections 70, 72, whereas the end wall 16 is comprised of a pair of separate and distinct sections 74, 76. The sections 70, 72 are of identical construction, each including an upper bar 76 and a lower bar 78 having vertical bars 80 extending therebetween. The bars 80, of course, can have their upper ends welded to the horizontal bar 76 and their lower ends welded to the bars 78 in a fashion similar to the way in which the previously mentioned vertical bars 22 are attached to the upper and lower bars 18, 20 of the side walls 10 and 12. As shown, the section 72 of the end wall 14 is provided with a ladder, the runs of this ladder having been designated by the numeral 82.

The sections 70 and 72 are hinged or pivotally connected to the side walls 10, 12 by means of pins 84 affixed to these side walls at the rear ends of their upper and lower bars 18, 20. The upper bars 76 and the lower bars 78 of the end wall 14 have apertures extending therethrough for the accommodation of these pins 84.

The adjacent pins of the two sections 70, 72 are also hinged or pivotally connected together through the agency of a pair of U-shaped straps 86. It will be observed that these U-shaped straps 86 embrace the upper and lower ends of the two adjacent vertical bars 80. The encirclement of the adjacent vertical bars 80 is completed through the medium of a pair of pins 88 passing through the ends of the two straps 86. These pins 88 are readily removable so that the sections 70, 72 can be swung outwardly about the pins 84 after the frame has been loaded with hay. However, this feature will be better understood from what will be said hereinafter in conjunction with the description of FIGURE 2.

Mounted in a manner quite similar to the previously referred to wheels 26 are additional wheels 90, these wheels being situated near the adjacent ends of the sections 70, 72. Accordingly, each wheel 90 is carried on a fork unit 92 having an upstanding stub shaft 94 passing through a bearing 96 secured to the lower horizontal bar 78. By such an arrangement, it will of course be realized that these wheels 90 are capable of swiveling in a manner corresponding to the wheels 26.

Each end section 70, 72 is equipped with an upstanding pin 98 near their hinged connection with each other. Once again, the function of the pins 98 will be better understood later on, but it can be stated at this time that these pins are instrumental in maintaining the collapsed condition of the portable stack frame, being engageable in the aperture at the opposite ends of two of the braces 60 which have their first ends engaged with the pins 62 near the rear end of the side wall 10 and the side wall 12.

At this time the forward end wall 16 will be referred to with greater particularity. First, a description will be given with respect to the section 74. This section 74 has a horizontal upper bar 100 and a horizontal lower bar 102, there being a plurality of spaced vertical bars 104 extending therebetween. It is contemplated that a ladder will be incorporated into the end section 74 and the rungs of this particular ladder have been labeled 106.

The section 76 is somewhat similar to the section 74 but it is not identical as will now be discerned. The section 76 includes an upper bar 108, a lower bar 110 with interconnecting vertical bars 112. However, it will be appreciated that these horizontal bars 108, 110 are set forwardly from the corresponding bars 100, 102 of the other forward end section 74. The offset relationship of the two lower bars 102, 110 is best understood from an inspection of FIGURE 4.

The two forward end sections 74, 76 are hinged or pivotally connected to the side walls 10, 12 by means of upstanding pins 114 carried by the upper bars 18 and the lower bars 20 of the two side walls.

With particular reference now to FIGURE 4, attention is called to the use of a clevis in the form of a U-shaped strap member 116 which is welded to the lower bar 102. This U-shaped strap 116 has a pair of aligned apertures for the accommodation of a pin 118 which extends through an aperture provided in the lower bar 110. Although not readily discernible from FIGURE 1, it will be understood that the upper bars 100, 108 are similarly hinged together. Stated somewhat differently, it is through the use of these pins 118 that the end sections 74, 76 are hinged to each other. In order to maintain a substantially coplanar relationship between the end sections 74, 76, a somewhat longer U-shaped strap 120 is welded to the lower bar 102 and a corresponding strap is welded to the upper bar 100. These straps are somewhat longer than the straps 116 and overlap the bars 110, 108, respectively. Each strap 120 is provided with aligned apertures for the reception of a removable L-shaped pin 122. With the pins 122 in place, the coplanar relationship of the end sections 74, 76 is maintained.

For the purpose of engaging the opposite ends of the forward two braces 60 a pin 124 and a pin 126 are utilized, the pin 124 being carried on the lower bar 102 and the pin 126 being carried on the lower bar 110.

While the foregoing description completes the basic haystacking frame constituting the invention, it should be noted that a pair of angularly disposed drawbars 128 are located at the forward end of the frame. These V-shaped drawbars 128 may be attaced to the frame in any preferred manner. Although a pair of pins 130 have been shown as passing through projecting ends of the lower bars 20 of the side walls 10, 12, it will be appreciated that in actual practice a suitable universal connection will be employed so that the drawbars 128 may be swung upwardly into a substantially planar relationship with the forward end wall 16 as is done in FIGURE 1. The other ends of the drawbars 128 are pivotally connected by pins 132 through a pair of draft plates 134. The draft plates 134 also support a pin 136 via which the entire frame can be coupled to the rear end of a truck 138.

With the above understanding of the elements and their organization with respect to each other in making up the portable haystacking frame, the operation and use of my frame will be readily understood from the description which follows. Various hay loading devices are currently on the market for gathering, elevating, and then dumping the hay. With the haystacking frame in the condition pictured in FIGURE 1, hay can readily be dumped thereinto from either side or from either end. When the enclosure has been filled, the farmer will detach the U-shaped straps 86 at the rear end of the frame, thereby freeing the sections 70, 72 so that they can be swung outwardly. Having done this, the tractor 138 is moved forwardly and the stacked hay, which has been labeled 140 in FIGURE 2, remains in place as the frame is withdrawn. In so doing the side walls 10, 12 freely slip along the stacked hay 140. FIGURE 2 depicts the frame in what amounts to almost a completely withdrawn relationship.

Assuming now that it is desired to transport the frame to a new and different location and that it is desirable or expedient to partially collapse the frame, the farmer will first disengage the pins 122 at the forward end of the frame and will also replace the U-shaped straps 86 after having swung the rear sections 70, 72 together. This permits the rear sections 70, 72 to be angularly oriented in an inwardly direction as indicated in FIGURE 3, and by the same token the forward end sections 74, 76 may be disposed at a similar inward angle, thereby temporarily forming V-shaped end walls (FIGURE 3). It is at this time that the braces 60 are employed. Two of the braces 60 will extend from the pins 98 on the rear section 70, 72 to the more rearwardly disposed pins 62 on the side walls 10, 12. The othe two braces will extend in similar fashion from the pins 124, 126 on the forward sections 74, 76 to the more forwardly disposed pins 62 on the side walls 10, 12. When the braces are so connected, as pictured in FIGURE 3, it will be appreciated that a rigid frame structure is provided that can be moved readily.

It will be recalled that the wheels 34 can be locked in parallelism. The need for this locking will now be readily understood, for such a locking feature prevents unnecessary swaying or swinging of the entire frame as it is being towed by the tractor 138. All that need be done is to insert the L-shaped pins 50 so that the wheels 34 are retained in aforementioned parallel relationship. When locked they naturally cannot swivel as they would otherwise be prone to do.

After reaching the new location, the braces 60 can be removed from the various pins 62, 98, 124 and 126, thereby permitting the frame to assume its rectangular configuration, which configuration appears in FIGURE 1. After reinserting the L-shaped pins 122 in the two straps 120 and also after having reconnected the U-shaped straps 86, the frame is in condition for the reception of another batch of hay.

Since the use of the frame is somewhat seasonal, the frame may be more fully collapsed than it appears in FIGURE 3 by completely removing the braces 60, or by providing additional pins 62 on the side walls 10, 12 which are nearer to each other. In either event it will be appreciated that the side walls 10, 12 can be moved almost together so that the frame will occupy but little space during storage.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A portable haystacking frame open at its top and bottom comprising a pair of parallel side walls, a pair of opposite end walls each including first and second sections, respective first means pivotally connecting the first and second sections of each end wall together, respective second means pivotally connecting said first and second sections to said side walls, whereby said end walls may be selectively moved into a substantially planar relationship to space said side walls a maximum distance apart for the stacking and may be moved into an angular relationship to space said side walls a lesser distance apart to facilitate the transport of the frame from one location to another, and means for releasably retaining both of said end walls in a V-shaped angular condition during transport of said frame.

2. A portable haystacking frame in accordance with claim 1 wherein said last mentioned means comprises detachable brace means.

3. A portable haystacking frame comprising a pair of parallel side walls, a pair of opposite end walls each including first and second sections, respective first means pivotally connecting the first and second sections of each end wall together, respective second means pivotally connecting said first and second sections to said side walls, one of said first pivotal means being separable so as to permit the first and second sections of the one end associated therewith to be swung outwardly to allow the frame to be withdrawn from the hay after stacking thereof, and a wheel near each end of said side walls and a wheel near the end of each first and second section of said one end wall which is adjacent said separable pivotal means, whereby said walls may be selectively moved into a substantially planar relationship to space said side walls a maximum distance apart for the stacking and may be moved into an angular relationship to space said side walls a lesser distance apart to facilitate the transport of the frame from one location to another.

4. A haystacking frame in accordance with claim 3 in which said brace means includes a plurality of elongated members having an aperture at each end, an upstanding pin on each of said first and second sections for engaging the respective apertures at one end of said members, and a pair of similar upstanding pins on each side wall for engaging the respective apertures at the other end of said members, whereby the length of said members and the locations of said pins will determine the spacing of said side walls during transport.

5. A haystacking frame in accordance with claim 3 in which each wheel is mounted for swivel movement, and means associated with those wheels on said side walls situated nearer said one end wall for locking these particular wheels in planes parallel to said side walls during transport.

6. A portable haystacking frame comprising a pair of rectangular side walls, a pair of end walls including first and second rectangular sections, first means pivotally and releasably connecting the adjacent ends of the first and second sections of one end wall to each other, respective second and third means pivotally connecting the opposite ends of the first and second sections of said one end wall to one end of each side wall, fourth means for pivotally connecting the adjacent ends of the first and second sections of the other end wall to each other, means associated with said fourth means for releasably maintaining the first and second sections of said other end wall in a substantially planar relation, respective fifth and sixth means pivotally connecting the opposite ends of the first and second sections of said other end wall to the other end of each side wall, and a plurality of brace bars detachably connectable to each rectangular section and to said side walls for maintaining the said adjacent ends of said respective rectangular sections comprising said end walls in an inwardly directed condition to form V-shaped end walls during transport of said frame.

7. A portable haystacking frame comprising a pair of rectangular side walls each including upper and lower horizontal bars and a plurality of spaced vertical bars connected thereto, a pair of end walls each including first and second sections comprised of upper and lower horizontal bars and a plurality of spaced vertical bars connected thereto, an upstanding pin carried at each end of said upper and lower bars of said side walls, one end of each of said upper and lower bars of said end walls having an aperture for the pivotal accommodation of one of said pins thereby to hinge said first and second sections to said side walls, a pair of clevis units detachably encircling the upper and lower ends of the two nearest vertical bars of the first and second sections of one end wall to thereby pivotally connect these particular first and second sections together, pin means pivotally connecting the adjacent ends of the first and second sections of the other end wall together, and releasable means associated with the first and second sections of said other end wall for maintaining a substantially planar relationship between these last-mentioned first and second sections.

8. A haystacking frame in accordance with claim 7 including a swivel wheel near each end of each side wall and a swivel wheel near the adjacent ends of the first and second sections of said one end wall, means for locking the wheels of said side walls nearest said one end wall in parallelism, and draft means including a pair of elongated bars pivotally connected together at one end and pivotally connected at their opposite ends to the lower bars of said side walls at the ends thereof adjacent said other end wall.

References Cited in the file of this patent

UNITED STATES PATENTS

| | | |
|---|---|---|
| 479,680 | Thompson | July 26, 1892 |
| 988,682 | Wattripont | Apr. 4, 1911 |
| 2,586,251 | Peebles | Feb. 19, 1952 |
| 2,729,196 | Breitenbach | Jan. 3, 1956 |
| 2,932,299 | Brandt et al. | Apr. 12, 1960 |

OTHER REFERENCES

NDAC Extension Service publication, "Hay Stacking Frames," North Dakota Agricultural College, Dec. 2, 1957.